US008291259B2

(12) United States Patent
Guthrie et al.

(10) Patent No.: US 8,291,259 B2
(45) Date of Patent: Oct. 16, 2012

(54) DELETE OF CACHE LINE WITH CORRECTABLE ERROR

(75) Inventors: Guy L. Guthrie, Austin, TX (US);
Harmony L. Helterhoff, Austin, TX (US); Kevin F. Reick, Round Rock, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 12/424,412

(22) Filed: Apr. 15, 2009

(65) Prior Publication Data

US 2010/0268984 A1 Oct. 21, 2010

(51) Int. Cl.
*G06F 11/00* (2006.01)
(52) U.S. Cl. .............................. 714/6.1; 714/42; 714/48
(58) Field of Classification Search ................... 714/6.1, 714/42, 48
See application file for complete search history.

(56) References Cited

U.S. PATENT DOCUMENTS

| 4,782,490 | A | 11/1988 | Tenengolts |
| 5,241,546 | A | 8/1993 | Peterson et al. |
| 2004/0215996 | A1* | 10/2004 | Kanamori et al. ............ 713/600 |
| 2005/0028039 | A1* | 2/2005 | Henderson et al. ............ 714/42 |
| 2006/0112306 | A1* | 5/2006 | Chessin et al. ................... 714/7 |
| 2008/0104333 | A1* | 5/2008 | Veazey ......................... 711/141 |
| 2008/0294847 | A1* | 11/2008 | Maruyama et al. ............ 711/133 |

OTHER PUBLICATIONS

Rogers, Brian et al; "Efficient Data Protection for Distributed Shared Memory Multiprocessors"; Dept. of Electrical and Computer Engineering, North Carolina State University; ACM 1-59593-264-X, Jun. 2009.
Rao, Jun et al; "Making B+-Trees Cache Conscious in Main Memory"; Columbia University; AMC 1-58113-218; 2000, pp. 475-486.
Kaxiras, Stefanos et al; IPStach: a Power-Efficient Memory Architecture for IP-lookup; IEEE, 2003; Proceedings of the 36th International Symposium on Microarchitecture.
Method for Update Bits to Improve Recoverability From Uncorrectable Errors for Last-Level Cache; IP.COM Prior Art Database, Technical Disclosure; IPCOM00143907D; Dec. 12, 2006.

* cited by examiner

*Primary Examiner* — Scott Baderman
*Assistant Examiner* — Sarai Butler
(74) *Attorney, Agent, or Firm* — Yudell Isidore Ng Russell PLLC

(57) ABSTRACT

A processing unit includes a processor core and a cache memory coupled to the processor core. The cache memory includes a data array, a directory of the data array, error detection logic that sequentially detects a first, second and third correctable errors in the data array of the cache memory and provides indications of detection of the first, second and third correctable errors, and control circuitry that, responsive to the indication of the third correctable error and an indication that the first and second correctable errors occurred at too high a frequency, marks an entry of the data array containing a cache line having the third correctable error as deleted in the directory of the cache memory regardless of which entry of the data array contains a cache line having the second correctable error.

29 Claims, 8 Drawing Sheets

DELETE OF CACHE LINE WITH CORRECTABLE ERROR

This invention was made with United States Government support under Agreement No. HR0011-07-9-0002 awarded by DARPA. THE GOVERNMENT HAS CERTAIN RIGHTS IN THE INVENTION.

BACKGROUND OF THE INVENTION

1. Technical Field

The present invention relates generally to data processing and, in particular, to error handling in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be directly accessed by other cores in an MP system. Typically, in response to a memory access instruction such as a load or store instruction, the processor core first accesses the directory of the upper-level cache. If the requested memory block is not found in the upper-level cache, the processor core then accesses one or more lower-level caches (e.g., level two (L2) or level three (L3) caches) for the requested memory block.

Conventional cache hierarchies are subject to hard errors due to hardware failure and soft errors due to cosmic radiation and other transient electromagnetic events. The hard errors include "stuck bit" errors in which a single memory cell of a cache entry fails, thus causing a persistent stuck bit correctable error condition. The cache hardware typically contains error correction code (ECC) logic to correct such single-bit correctable error conditions.

In some prior art systems, additional action is taken to prevent a stuck bit condition from devolving to an uncorrectable multi-bit error condition. In particular, the cache entry containing the stuck bit can be taken off-line by performing a "line delete." In conventional systems, a "line delete" requires the cache hardware to record the specific entries for which a correctable error condition occurs in a software-monitored status register. Software monitors the status register, logs the entries recorded in the status register, runs a heuristic to determine if any of the specific entries has a stuck bit, and if so, issues a "line delete" command instructing the cache hardware to take the given entry off-line, for example, by setting a bit in the cache directory.

Tracking cache accesses and reporting to software the precise cache entries in which all correctable errors occur is expensive in terms of the amount of required hardware. Further, the software required to monitor for, detect, and then address frequently occurring correctable errors through line delete actions is difficult to correctly code and to test.

SUMMARY OF THE INVENTION

According to one embodiment, a processing unit includes a processor core and a cache memory coupled to the processor core. The cache memory includes a data array, a directory of the data array, error detection logic that sequentially detects a first, second and third correctable errors in the data array of the cache memory and provides indications of detection of the first, second and third correctable errors, and control circuitry that, responsive to the indication of the third correctable error and an indication that the first and second correctable errors occurred at too high a frequency, marks an entry of the data array containing a cache line having the third correctable error as deleted in the directory of the cache memory regardless of which entry of the data array contains a cache line having the second correctable error.

DETAILED DESCRIPTION OF ILLUSTRATIVE EMBODIMENT(S)

Figure 1:
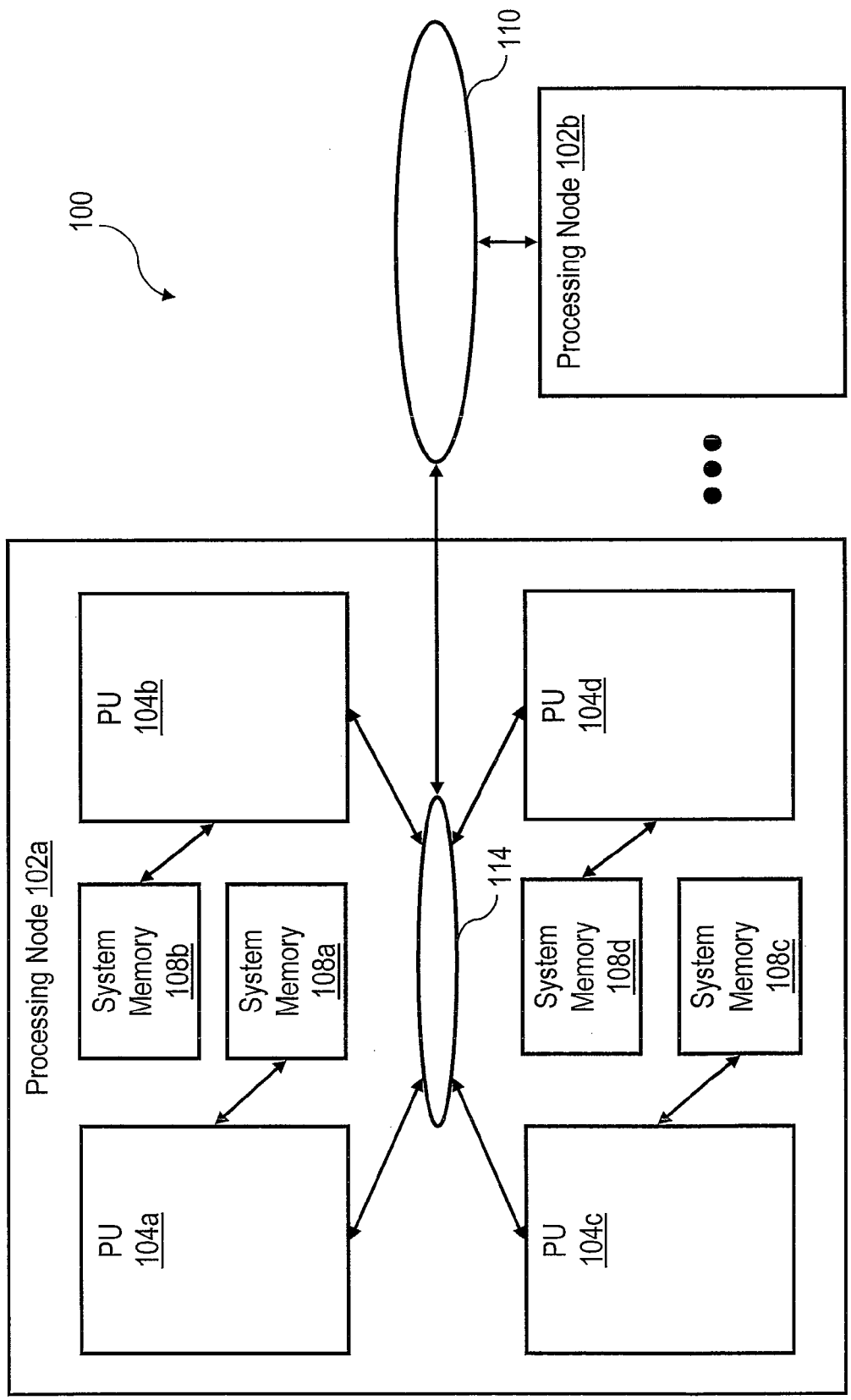
FIG. 1 is a high level block diagram of an exemplary embodiment of a multiprocessor data processing system in accordance with one embodiment.

With reference now to the figures and, in particular, with reference to FIG. 1, there is illustrated a high level block diagram of an exemplary embodiment of a multiprocessor data processing system. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. Local interconnects 114 and system interconnect 110 together form an interconnect fabric, which preferably supports concurrent communication of operations of differing broadcast scopes. For example, the interconnect fabric preferably supports concurrent communication of operations limited in scope to a single processing node 102 and operations broadcast to multiple processing nodes 102.

The devices coupled to each local interconnect 114 include not only processing units 104, but also one or more system memories 108a-108d. Data and instructions residing in system memories 108 can generally be accessed and modified by a processor core (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2A:
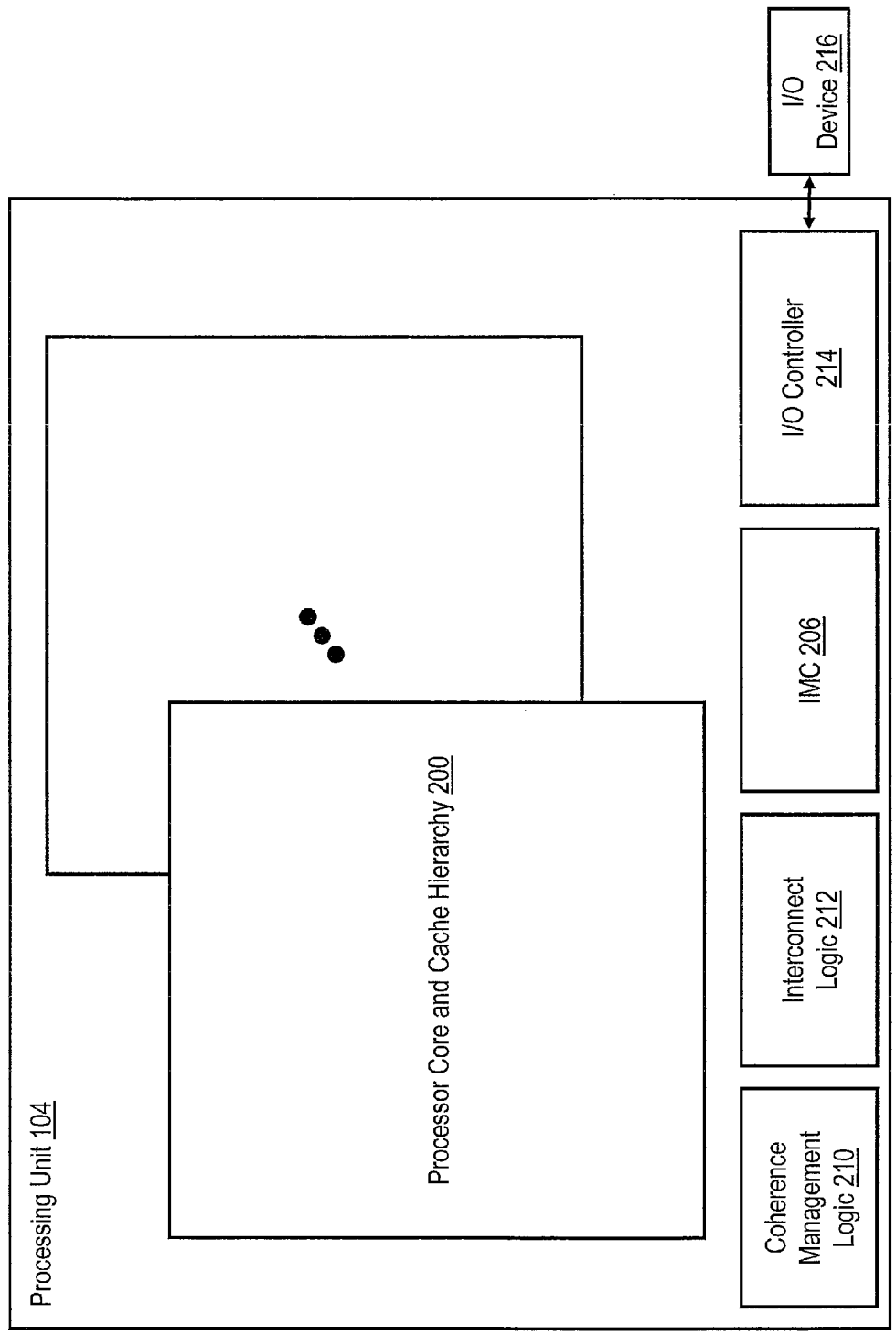
FIG. 2A is a more detailed block diagram of an exemplary processing unit of the data processing system of FIG. 1 in accordance with one embodiment.

Referring now to FIG. 2A, there is depicted a more detailed block diagram of an exemplary processing unit 104 in accordance with one embodiment. In the depicted embodiment, each processing unit 104 includes multiple instances of a processor core and associated cache hierarchy, which are collectively identified by reference numeral 200. In the depicted embodiment, each processing unit 104 also includes an integrated memory controller (IMC) 206 that controls read and write access to one or more of the system memories 108a-108d within its processing node 102 in response to requests received from processor cores and operations snooped on the local interconnect 114.

Each processing unit 104 also includes an instance of coherence management logic 210, which implements a portion of the distributed snoop-based coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 2B:
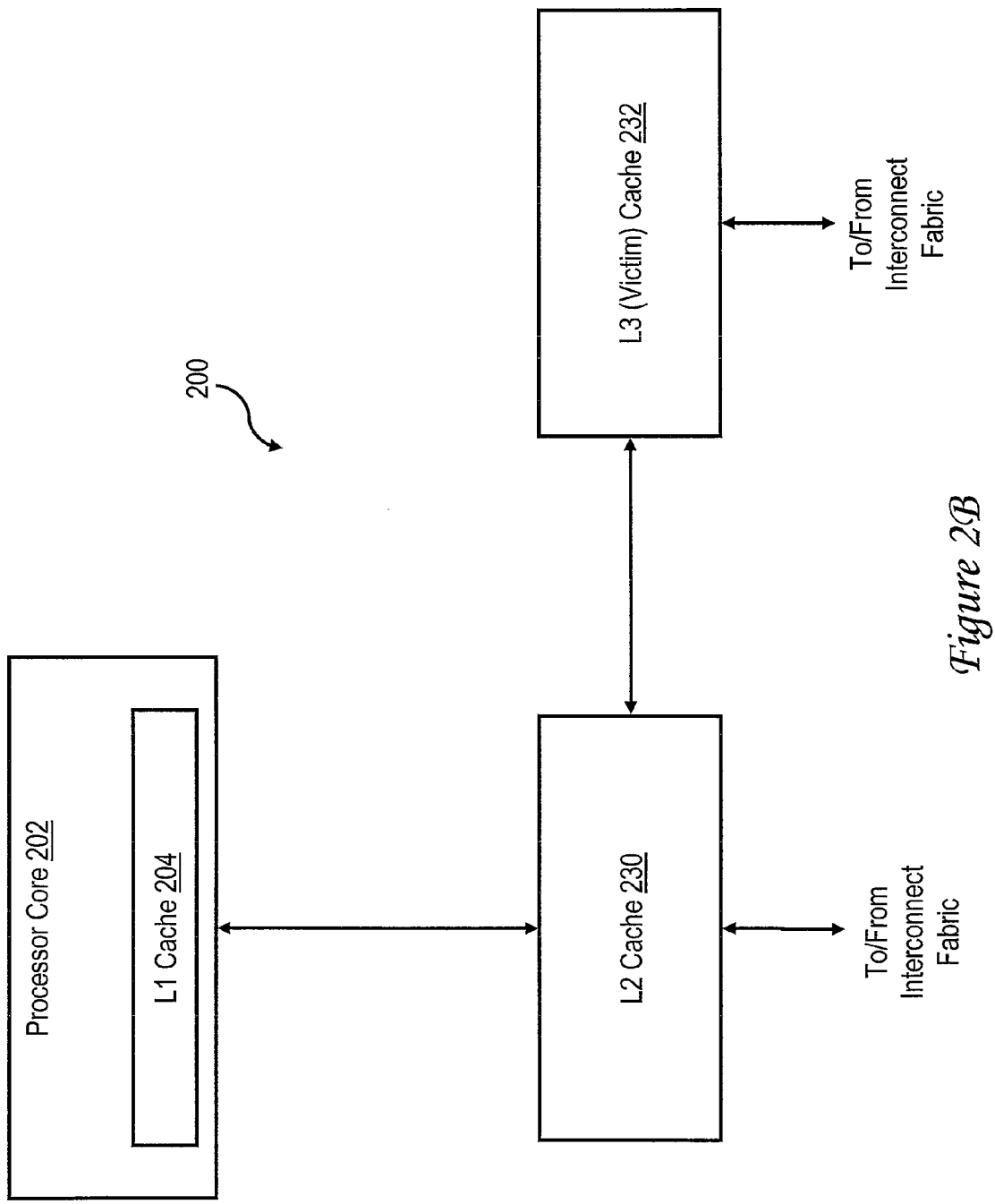
FIG. 2B is a more detailed block diagram of an exemplary embodiment of a processor core and associated cache hierarchy from FIG. 2A.

With reference now to FIG. 2B is a more detailed block diagram of an exemplary embodiment of a processor core and associated cache hierarchy 200 from FIG. 2A. Processor core 202 includes circuitry for processing instructions and data. In the course of such processing, the circuitry of processor core 202 generates various memory access requests, including as load-type requests requesting a copy of data and store-type requests requesting modification of data.

The operation of processor core 202 is supported by a cache memory hierarchy. In one exemplary embodiment, the cache memory hierarchy includes a store-through level one (L1) cache 204 within each processor core 202, a store-in level two (L2) cache 230, and a lookaside L3 cache 232 that is utilized as a victim cache for L2 cache 230 and accordingly is filled by cache lines evicted from L2 cache 230. In some embodiments, the contents of L3 cache 232 are not exclusive of the contents of L2 cache 230, meaning that a given memory block may be held concurrently in L2 cache 230 and L3 cache 232.

Although the illustrated cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 202 or shared by multiple processor cores 202. For example, in some implementations, the cache hierarchy includes an L2 cache 230 for each processor core 202, with multiple of the L2 caches 230 sharing a common L3 victim cache 232.

In operation, when a hardware thread under execution by a processor core 202 includes a memory access instruction requesting a specified memory access operation to be performed, the processor core 202 executes the memory access instruction to determine the target real address of a memory access request. Assuming that the memory access request cannot be serviced by L1 cache 204, processor core 202 transmits to L2 cache 230 the memory access request, which includes at least a transaction type (ttype) and a target real address. Depending on the ability of L2 cache 230 to service the memory access request, the memory access request may be further forwarded to L3 cache 232 and/or the interconnect fabric.

Figure 3:
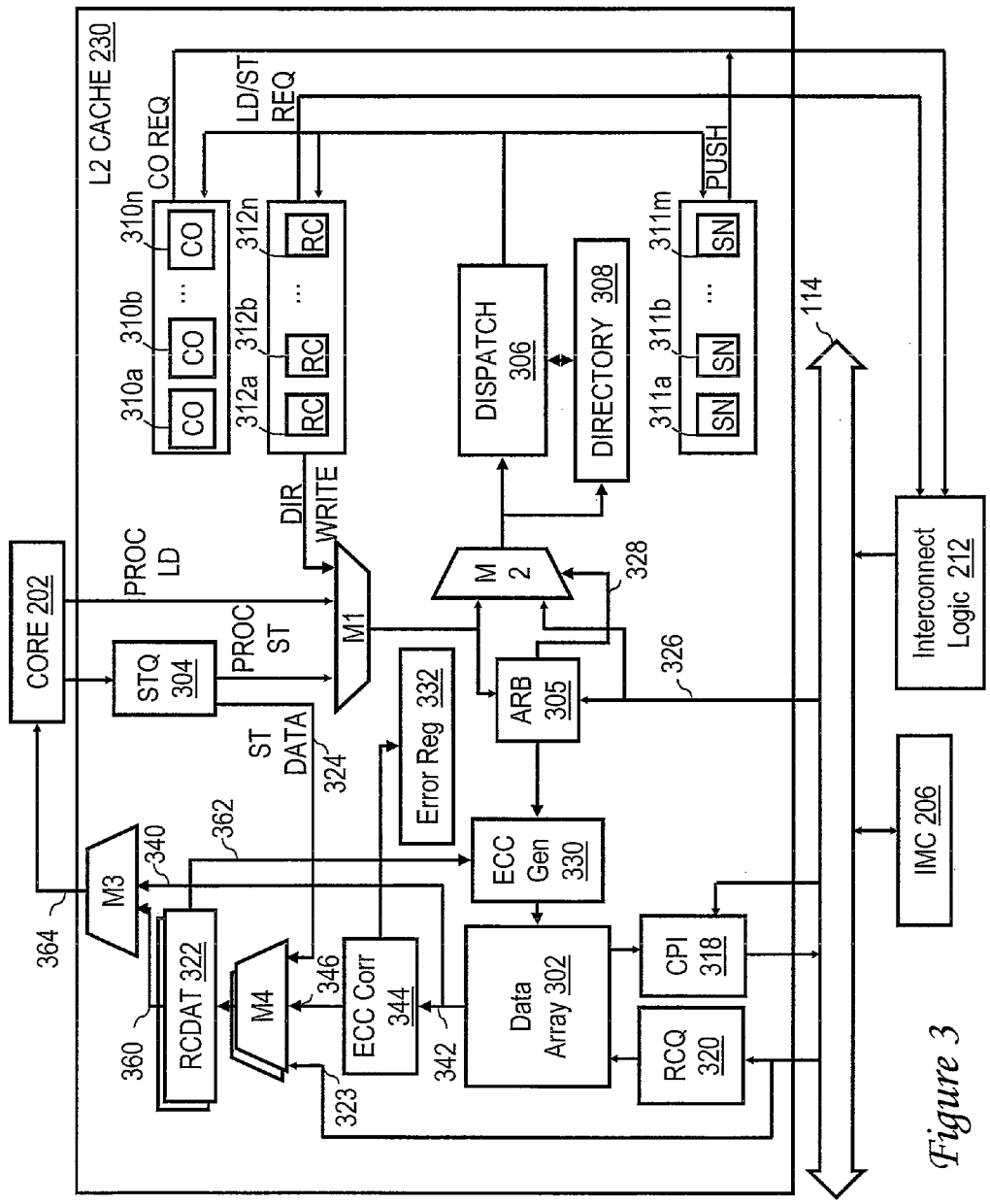
FIG. 3 is a more detailed block diagram of an exemplary embodiment of an L2 cache from FIG. 2B.

With reference now to FIG. 3, there is illustrated a more detailed block diagram of an exemplary embodiment of an L2 cache 230 in accordance with the present invention. As shown in FIG. 3, L2 cache 230 includes a data array 302 for temporarily storing data and instructions residing in system memory 108 and a directory.308 of the contents of data array 302.

Assuming data array 302 and directory 308 are set associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherence state of the cache line, a LRU (Least Recently Used) field indicating a replacement order for the cache line with respect to other cache lines in the same congruence class, and inclusivity bits indicating whether the memory block is held in the associated L1 cache 204.

L2 cache 230 includes multiple (e.g., 16) Read-Claim (RC) machines 312a-312n for independently and concurrently servicing load-type (LD) and store-type (ST) requests received from the affiliated processor core 202. In order to service remote memory access requests originating from processor cores 202 other than the affiliated processor core 202, L2 cache 230 further includes multiple snoop machines 311a-311m. Each snoop machine 311 can independently and concurrently handle a remote memory access request "snooped"

from local interconnect 114. As will be appreciated, the servicing of memory access requests by RC machines 312 may require the replacement or invalidation of memory blocks within data array 302. Accordingly, L2 cache 230 includes CO (castout) machines 310 that manage the removal and writeback of memory blocks from data array 302.

L2 cache 230 further includes an arbiter 305 that controls multiplexers M1-M2 to order the processing of local memory access requests received from affiliated processor core 202 and remote requests snooped on local interconnect 114. Memory access requests, including local load-type and store-type operations and remote read and write operations, are forwarded in accordance with the arbitration policy implemented by arbiter 305 to dispatch logic, such as a dispatch pipeline 306, which processes each read/load and store request is processed with respect to directory 308 and data array 302 over a given number of cycles.

L2 cache 230 also includes an RC queue 320 and a CPI (castout push intervention) queue 318 that respectively buffer data being inserted into and removed from data array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from data array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. At least some of RCDAT buffers 322 have an associated store data multiplexer M4 that selects data bytes from among its inputs for buffering in the RCDAT buffer 322 in response unillustrated select signals generated by arbiter 305.

In operation, processor store-type requests comprising a transaction type (ttype), target real address and store data are received from the affiliated processor core 202 within a store queue (STQ) 304. From STQ 304, the store data are transmitted to store data multiplexer M4 via data path 324, and the store type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

As memory requests are dispatched and processed by CO machines 310, RC machines 312, and snoop machines 311, data array 302 is accessed to retrieve cache lines of data from data array 302 and install cache lines of data into data array 302. For each cache line of data placed in data array 302, ECC generation logic 330 generates and stores within data array 302 an error-correcting code (ECC). In one embodiment, as a cache line of data is retrieved from data array 302, ECC correction logic 344 computes an ECC over the cache line, compares the computed ECC with the stored ECC, detects and reports any single-bit (correctable) in one or more error registers 332, and corrects any single-bit (correctable) errors utilizing the ECC to construct the correct data.

Figure 4:
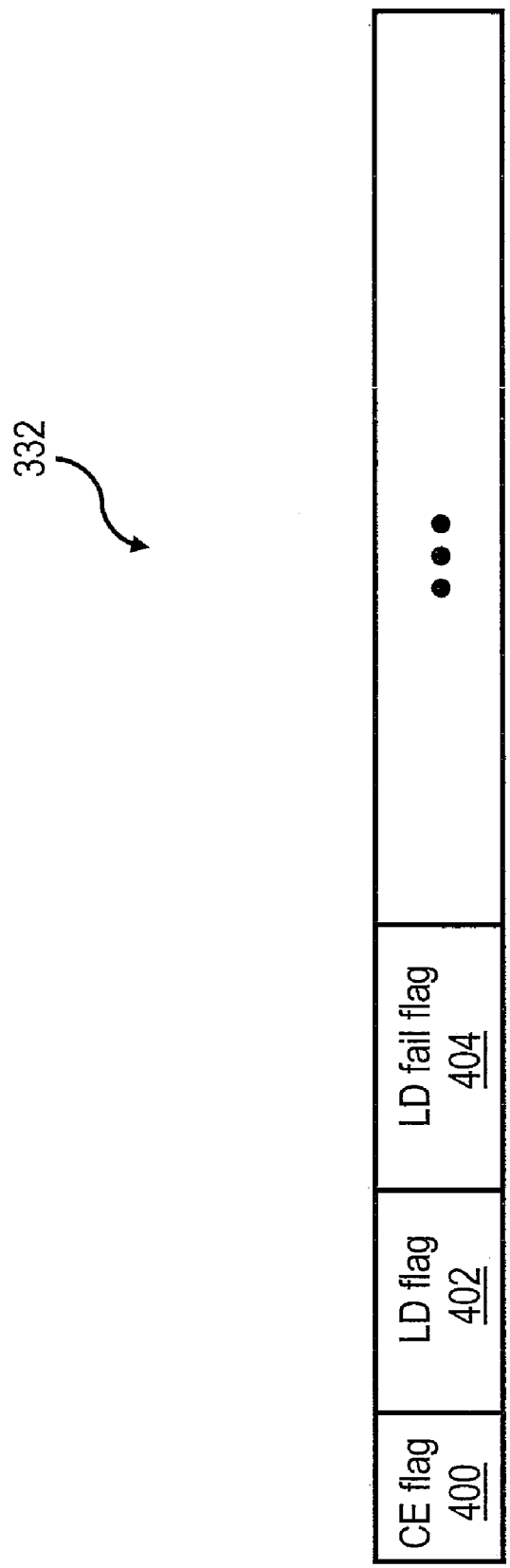
FIG. 4 is an exemplary embodiment of an error register in a cache memory.

Referring now to FIG. 4, there is depicted an exemplary embodiment of an error register 332 in accordance with one embodiment. In the illustrated embodiment, error register 332 includes a correctable error (CE) flag 400 that is set by ECC correction logic 344 to indicate detection of a single-bit (correctable) error. Error register 332 also includes a line delete (LD) flag 402 that is set to indicate that an entry in data array 302 containing a cache line in which a correctable error was detected should be "deleted" or taken out of use. Error register 332 also includes a LD fail flag 404 set to indicate that a line delete action indicated by line delete flag 402 has failed.

As indicated by ellipsis, error register 332 may also contain additional flags or fields not relevant to the present invention and accordingly not discussed further herein. Further, it should be appreciated that error register 332 can comprise more than one physical register structure.

Figure 5:
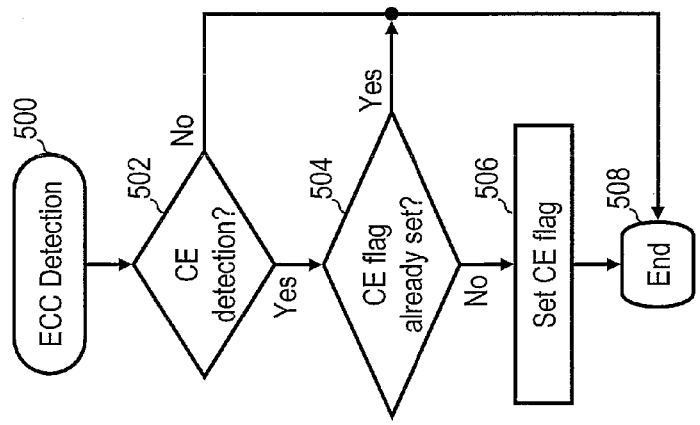
FIG. 5 is a high level logical flowchart of an exemplary process by which ECC correction logic signals detection of a single-bit (correctable) error in one embodiment.

With reference now to FIG. 5, there is illustrated a high level logical flowchart of an exemplary process by which ECC correction logic 344 signals detection of a single-bit (correctable) error. The process begins at block 500 when a cache line is retrieved from data array 302. As discussed above, ECC correction logic 344 computes the ECC of the retrieved cache line and compares the computed ECC with the ECC stored with the retrieved cache line to determine if the retrieved cache line contains a correctable error (block 502). In response to a determination at block 502 that no correctable error has been detected, the illustrated process ends block 508, perhaps with other processing if a uncorrectable error is detected.

Returning to block 502, in response to detection of a correctable error, the process passes to blocks 504 and 506, which illustrate ECC correction logic 344 setting CE flag 400 in error register 332 if it is not already set. Thereafter, the process of FIG. 5 ends at block 508.

Figure 6:
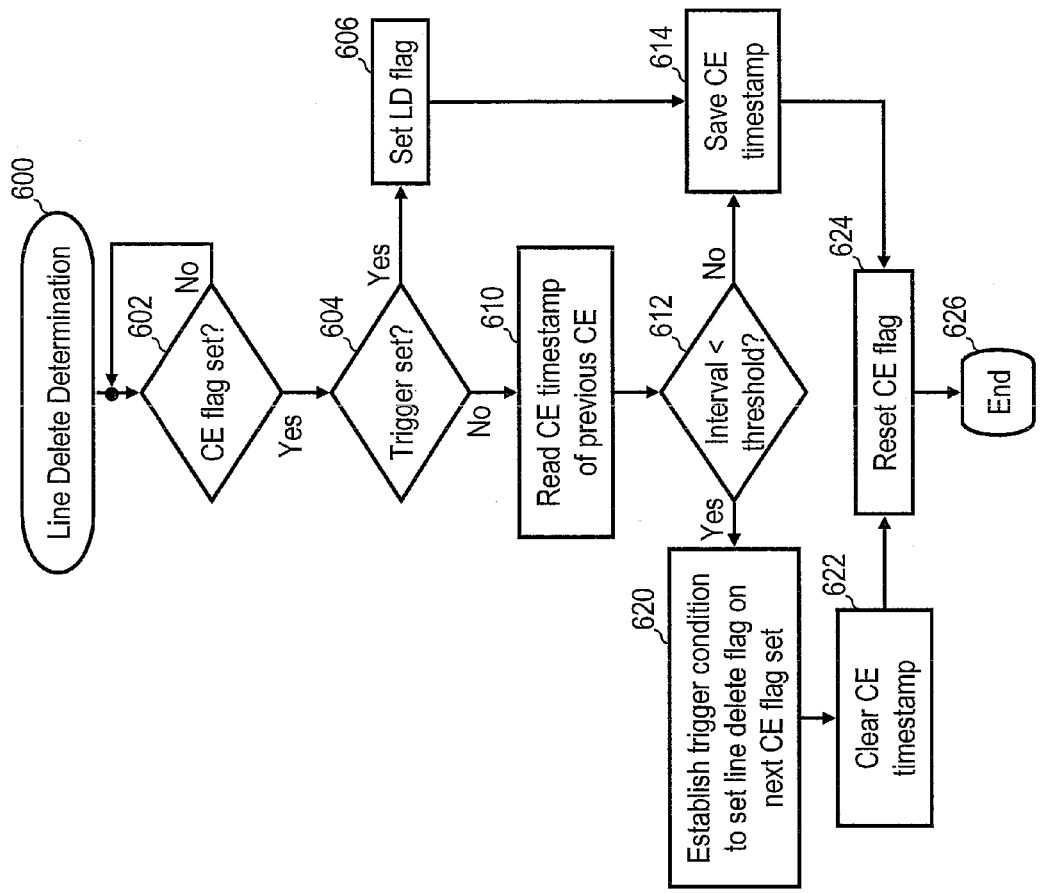
FIG. 6 is a high level logical flowchart of an exemplary process by which a line delete mechanism determines whether to initiate a line delete of an entry of a cache memory in one embodiment.

Referring now to FIG. 6, there is illustrated a high level logical flowchart of an exemplary process by which a line delete mechanism determines whether to initiate a line delete of an entry of a cache memory. The illustrated process can be performed, for example, by the execution of program code from data storage by a processing unit 104 of data processing system 100, and alternatively or additionally, by control circuitry residing within a cache memory. Such control circuitry can be implemented, for example, within ECC correction logic 344 or elsewhere within the cache memory.

The process of FIG. 6 begins at block 600 and then proceeds to block 602, which illustrates the line delete mechanism determining whether or not CE flag 400 of error register 332 has been set, for example, by the process illustrated in FIG. 5. If not, the process iterates at block 602. If, however, the line delete mechanism determines at block 602 that CE flag 400 has been set, the line delete mechanism determines whether a trigger condition has been established indicating that a line delete should be performed on the next detected correctable error (block 604). If not, the process proceeds to block 610, which is described below. If, however, the line delete mechanism determines at block 604 that the trigger condition has been established, the line delete mechanism sets LD flag 402 in error register 332 (block 606). The process then passes from block 606 to block 614, which is described below.

Block 610 illustrates the line delete mechanism reading a CE timestamp indicating when the previous correctable error was detected. The CE timestamp can be stored, for example, in a software history log or in a hardware count register (not illustrated). The line delete mechanism then determines whether the interval between the CE timestamp and a current time is less than a threshold, that is, whether correctable errors are occurring at too high a frequency (block 612). If not, the line delete mechanism records a current CE timestamp, for example, in a software history log or a hardware count register (block 614) and resets CE flag 400 (block 624). Thereafter, the process terminates at block 626.

Returning to block 612, in response to determining that the interval between detections of correctable errors is less than the threshold, that is, that correctable errors are occurring at too great a frequency, the line delete mechanism establishes a trigger indication, indicating that LD flag 402 will be set the next time that a correctable error is detected (block 620). The line delete mechanism then clears the CE timestamp (block 622) and resets CE flag 400 (block 624). Thereafter, the process terminates at block 626.

In the exemplary process of FIG. 6, it is recognized that soft errors are expected to occasionally occur in a cache memory, but at a relatively low frequency. A stuck-bit, if present, will generate correctable errors at a significantly higher frequency. Thus, in the illustrated methodology, the threshold is preferably set to a value low enough to differentiate stuck-bit correctable errors from soft correctable errors. If the threshold time between errors is crossed, it is assumed that the next detected correctable error is a stuck-bit correctable error, regardless of which entry in data array 302 actually contains the cache line that was associated with the previously detected correctable errors. In other words, the methodology depicted in FIG. 6 does not depend on precisely tracking, recording and matching the locations in data array 302 that generate errors, but instead utilizes correctable error frequency as an imprecise proxy for both the location and type of correctable error.

Figure 7:
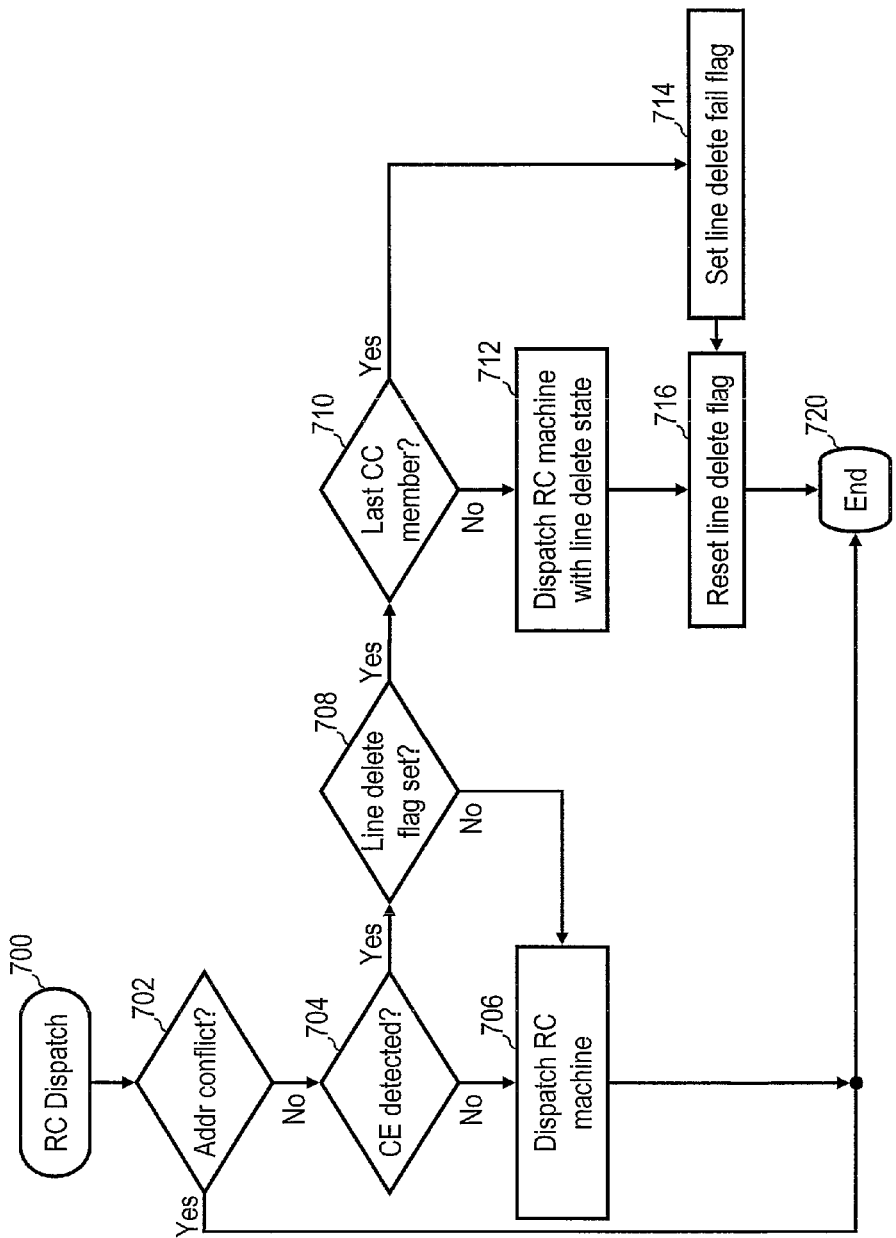
FIG. 7 is a high level logical flowchart of an exemplary process by which dispatch logic dispatches a memory access request received from an affiliated processor core for handling in one embodiment.

With reference now to FIG. 7, there is illustrated a high level logical flowchart of an exemplary process by which dispatch logic of a cache memory, assumed in the following description to be dispatch pipeline 306, dispatches a memory access request received from an affiliated processor core for servicing. The illustrated process begins at block 700 and then proceeds to block 702, which depicts dispatch pipeline 306 determining whether there is an address conflict between the target address of the new memory access request from the core presented to it by multiplexer M2 and that of a memory access request currently being serviced by one of CO machines 310 or RC machines 312. If so, no dispatch of the new memory access request is made in the current cycle, and the illustrated process ends at block 720.

Returning to block 702, if no address conflict is detected, dispatch pipeline 306 determines whether or not a correctable error was detected in the target memory block of the new memory access request (block 704). The determination at block 704 can be made, for example, by sensing the state of a signal generated by ECC correction logic 344. If no correctable error was detected in the target memory block of the memory access request, dispatch pipeline 306 dispatches an available one of RC machines 312 to service the memory access request (block 706).

If, however, a correctable error was detected in the target memory block of the core's memory access request, dispatch pipeline 306 determines at block 708 whether or not LD flag 402 of error register 332 has been set by the line delete mechanism to indicate that a line delete should be performed. If not, dispatch pipeline 306 dispatches an available one of RC machines 312 to service the memory access request (block 706). Thereafter, the process ends at block 720.

Referring again to block 708, if dispatch pipeline 306 determines that LD flag 402 is set, then dispatch pipeline further determines by reference to directory 308 whether or not the entry in data array 302 containing the target memory block is a last remaining non-deleted entry in its congruence class (block 710). For example, if data array 302 is 8-way set associative and seven other entries in the same congruence class have been marked in directory 308 as "deleted" (i.e., un-useable), then an affirmative determination is made at block 710; otherwise, a negative determination is made.

Figure 8:
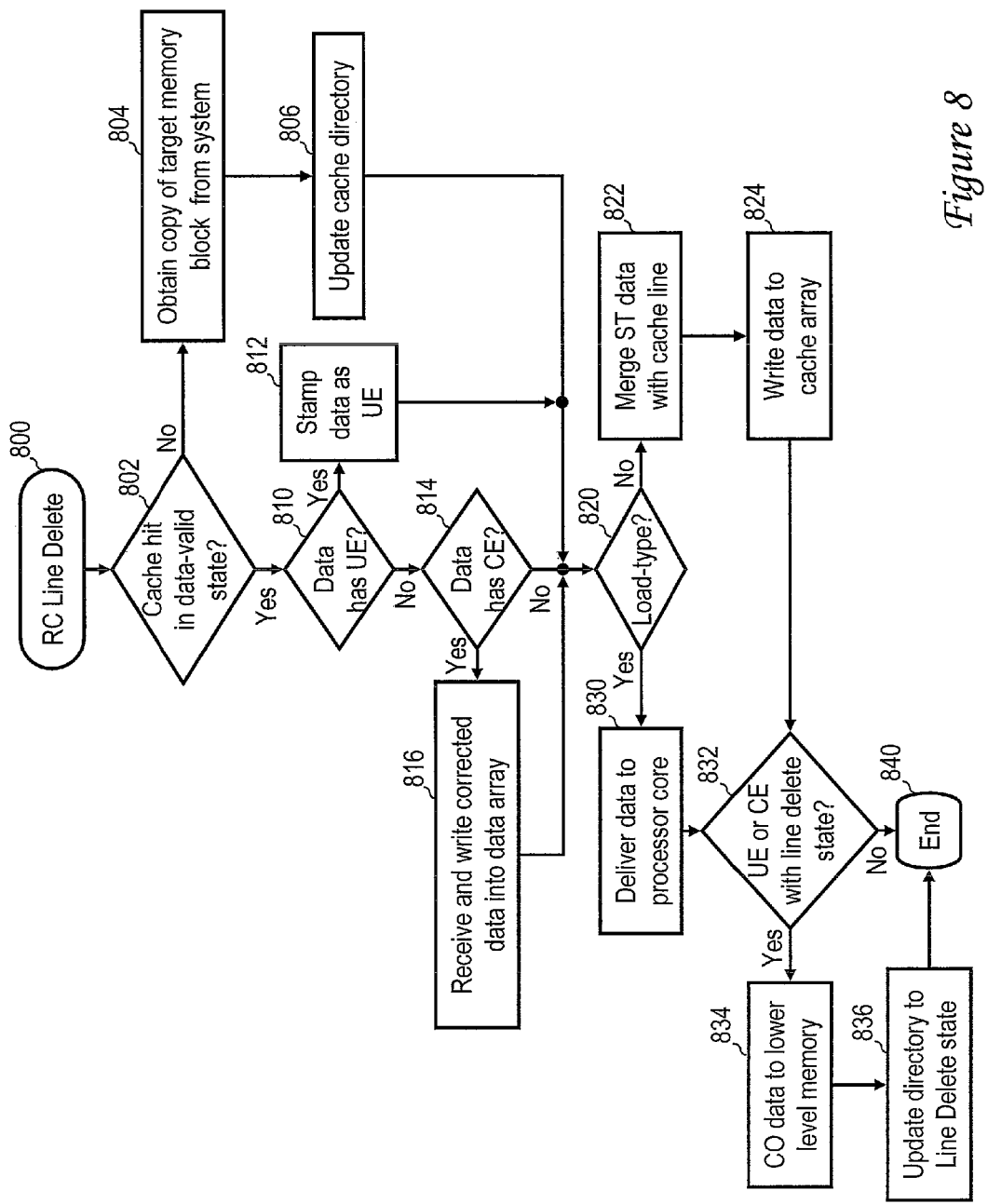
FIG. 8 is a high level logical flowchart of an exemplary process of performing a line delete in one embodiment.

In response to a negative determination at block 710, the process proceeds to block 712, which illustrates dispatch pipeline 306 dispatching an available one of RC machines 312 to service the memory access request with a line delete state asserted, which causes the RC machine 312 to perform a line delete operation as discussed further with respect to FIG. 8. Dispatch pipeline 306 then resets LD flag 402 of error register 332 at block 716. Thereafter, the process ends at block 720.

Returning to block 710, in response to a determination that the entry of data array 302 containing the target memory block of the memory access request is a last non-deleted entry of its congruence class, dispatch pipeline 306 sets LD fail flag 404 in error register 332 to prompt logging of the failure of the line delete operation, for example, in a software or hardware-managed trace array (block 714). Thereafter, dispatch pipeline 306 resets LD flag 402 at block 716, and the process ends at block 720.

Referring now to FIG. 8, there is depicted a high level logical flowchart of an exemplary process by which an RC machine 312 services a memory access request, including performance of any indicated line delete operation, in accordance with one embodiment. The process shown in FIG. 8 begins at block 800 in response to dispatch of an RC machine 312 to service a memory access request of the affiliated processor core 202 and then proceeds to block 802. Block 802 illustrates the RC machine 312 determining whether the lookup in directory 308 of the real address of the target memory block of the memory access request resulted in a cache hit in a data-valid coherence state. If not, RC machine 312 obtains a copy of the target memory block via communication on the interconnect fabric (block 804) and updates cache directory 308 in accordance with the coherence state indicated by the coherence management logic 210 (block 806). The process then proceeds to block 820, which is described below.

In response to a determination at block 802 that that real memory address of target memory block of the memory access request hit in cache directory 308 in a data valid state, RC machine 312 determines at blocks 810-812 whether or not an uncorrectable error (UE) or correctable error (CE) is reported for the target memory block by ECC correction logic 344. If not, the process simply proceeds to block 820, which is described below. If an uncorrectable error is reported by ECC correction logic 344, RC machine 312 "stamps" the target memory block as containing an uncorrectable error, for example, by associating a UE indication with the target memory block (block 812). If, on the other hand, a correctable error is reported by ECC correction logic 344, RC machine 312 receives the corrected data for the target memory block from ECC correction logic 344 and writes the corrected data into data array 302 (block 816). Following either block 812 or block 816, the process proceeds to block 820.

Block 820 illustrates RC machine 312 examining the transaction type (ttype) of the memory access request to determine whether the memory access request it is servicing is a load-type or store-type request. If the memory access request is a load-type request, RC machine 312 causes data from the target memory block to be delivered to the affiliated processor core 202 (block 830). If, on the other hand, the memory access request is a store-type request, RC machine 312 causes the store data received from the affiliated processor core 202 to be merged with the target memory block and then written into data array 302 (blocks 822 and 824). Following either block 824 or block 830, the process passes to block 832.

Block 832 illustrates RC machine 312 determining if a line delete operation is required, for example, if an uncorrectable error was detected in the target memory block or if a correctable error was detected in the target memory block and the line delete state is asserted. If RC machine 312 determines that no line delete operation is required, RC machine 312 returns to an idle state, and the process simply ends at block 840. If, however, RC machine 312 determines at block 832 that a line delete operation is required, RC machine 312 issues a castout request at block 834 to cause a CO machine 311 to be dispatched to handle a castout of the target memory block from data array 302 to a lower level memory (e.g., L3 cache 232 or system memory 108). Once the target memory block is evacuated from data array 302, RC machine 312 issues a directory write request at block 836 to mark the entry formerly containing the target memory block as deleted (i.e., un-useable). In one preferred embodiment, the entry is marked as deleted by setting the coherence state of the entry to a special "line delete" coherence state that removes the entry from service. Thereafter, RC machine 312 returns to an idle state, and the process ends at block 840.

As has been described, a technique for detecting and addressing a stuck bit correctable error condition in a cache memory of an operating data processing system includes: 1) hardware detecting and reporting a correctable error (e.g., a stuck bit condition) to a status register; 2) a software and/or hardware line delete mechanism monitoring the status register for occurrences of a correctable error condition and detecting when the frequency of these occurrences indicates that a stuck bit correctable error condition has likely occurred; 3) a software and/or hardware line delete mechanism asserting a line delete indication to signal a "line delete" action, for example, in response to the next detected correctable error condition; and 4) hardware detecting assertion of the line delete indication and then performing a line delete by moving the contents of the affected cache entry and marking the cache entry as "Line Deleted" in the cache directory on the next occurrence of a correctable error condition.

While the invention has been particularly shown and described with reference to one or more preferred embodiments, it will be understood by those skilled in the art that various changes in form and detail may be made therein without departing from the spirit and scope of the invention. For example, although a line deletion technique has been described with reference to a level two (L2) cache memory, it will be appreciated that it is also applicable to other cache memories. Further, although aspects have been described with respect to a computer system executing program code that directs the functions of the present invention, it should be understood that present invention may alternatively be implemented as a program product including a storage medium storing program code that can be processed by a data processing system.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core having an associated cache memory, said method comprising:
   the cache memory detecting a correctable error in a cache line read from a data array of the cache memory and providing an indication of detection of the correctable error;
   in response to the indication of detection of the correctable error, determining whether a frequency of correctable errors within a predetermined time period exceeds a predetermined threshold across multiple cache lines in the cache memory, and if so, providing an indication of a line delete regardless of a location of the cache line having the correctable error in the data array; and
   in response to an indication of a line delete, the cache memory marking an entry of the cache memory containing the cache line as deleted in a directory of the cache memory.

2. The method of claim 1, wherein:
   the cache line comprises a first cache line;
   the correctable error comprises a first correctable error detected in response to a first memory access request;
   said method further comprises:
     detecting a second correctable error in a second cache line read from the data array in response to a second memory access request and providing an indication of detection of the second correctable error;
   the entry contains the second cache line; and
   said marking comprises marking the entry as deleted in response to the indication of detection of the second correctable error.

3. The method of claim 1, wherein:
   the cache memory is a set associative cache memory including a plurality of congruence classes each having multiple entries, wherein the entry belongs to a particular congruence class among the plurality of congruence classes;
   said marking includes:
     the cache memory determining if the particular congruence class contains more than one non-deleted entry; and
     the cache memory marking the entry as deleted only in response to determining the particular congruence class contains more than one non-deleted entry.

4. The method of claim 1, and further comprising:
   in response to an indication of a line delete, moving the cache line from the data array to a lower level memory.

5. The method of claim 1, wherein:
the cache memory is a set associative cache memory including a plurality of congruence classes each containing multiple entries;
providing an indication of detection of the correctable error comprises providing an indication of detection of the correctable error independent of which entry contains the cache line having the correctable error.

6. The method of claim 1, wherein determining whether a frequency of correctable errors is too great and providing an indication of a line delete are performed by software.

7. The method of claim 1, wherein determining whether a frequency of correctable errors is too great and providing an indication of a line delete are performed by the cache memory.

8. The method of claim 1, wherein the determining includes determining whether the frequency of correctable errors is too great across multiple cache lines in the cache memory.

9. The method of claim 1, wherein determining whether a frequency of correctable errors is too great includes determining whether a time interval between detections of correctable errors is less than a threshold.

10. The method of claim 9, wherein the threshold has a value selected to differentiate stuck-bit correctable errors from soft correctable errors.

11. A processing unit, comprising: a processor core; and
a cache memory coupled to the processor core, said cache memory including: a data array; a directory of the data array; error detection logic that sequentially detects a first, second and third correctable errors in the data array of the cache memory and provides indications of detection of the first, second and third correctable errors;
control circuitry that, responsive to the indication of the third correctable error and an indication that the first and second correctable errors occurred within a predetermined time period exceeds a predetermined threshold across multiple cache lines in the cache memory, marks an entry of the data array containing a cache line having the third correctable error as deleted in the directory of the cache memory regardless of which entry contains a cache line having the second correctable error.

12. The processing unit of claim 11, and further comprising:
a line delete flag set to indicate that the first and second correctable errors occurred at too high a frequency.

13. The processing unit of claim 12, and further comprising a line delete mechanism that, responsive to the indication of detection of the second correctable error, determines whether the first and second correctable errors occurred at too high a frequency, and if so, sets the line delete flag.

14. The processing unit of claim 11, wherein:
the cache memory is a set associative cache memory including a plurality of congruence classes each having multiple entries, wherein the entry belongs to a particular congruence class among the plurality of congruence classes;
the control circuitry determines if the particular congruence class contains more than one non-deleted entry and marks the entry as deleted only in response to determining the particular congruence class contains more than one non-deleted entry.

15. The processing unit of claim 11, wherein the control circuitry, responsive to the indication of the third correctable error and the indication that the first and second correctable errors occurred at too high a frequency, moves the cache line from the data array to a lower level memory.

16. The processing unit of claim 11, wherein:
the cache memory is a set associative cache memory including a plurality of congruence classes each containing multiple entries;
the error detection logic provides an indication of detection of the correctable error independent of which entry contains the cache line having the correctable error.

17. The processing unit of claim 11, wherein the first and second correctable errors occur in different cache lines in the cache memory.

18. The processing unit of claim 13, wherein the line delete mechanism determines whether a frequency of correctable errors is too great by determining whether a time interval between detections of first and second correctable errors is less than a threshold.

19. The processing unit of claim 18, wherein the threshold has a value selected to differentiate stuck-bit correctable errors from soft correctable errors.

20. A data processing system, comprising: data storage; and
a plurality of processing units coupled to the system memory, wherein a processing unit among the plurality of processing units includes: a processor core; and
a cache memory coupled to the processor core, said cache memory including: a data array; a directory of the data array; error detection logic that sequentially detects a first, second and third correctable errors in the data array of the cache memory and provides indications of detection of the first, second and third correctable errors;
control circuitry that, responsive to the indication of the third correctable error and an indication that the first and second correctable errors occurred within a predetermined time period exceeds a predetermined threshold across multiple cache lines in the cache memory, marks an entry of the data array containing a cache line having the third correctable error as deleted in the directory of the cache memory regardless of which entry contains a cache line having the second correctable error.

21. The data processing system of claim 20, the processing unit further comprising:
a line delete flag set to indicate that the first and second correctable errors occurred at too high a frequency.

22. The data processing system of claim 21, and further comprising a line delete mechanism that, responsive to the indication of detection of the second correctable error, determines whether the first and second correctable errors occurred at too high a frequency, and if so, sets the line delete flag.

23. The data processing system of claim 22, wherein the line delete mechanism includes program code within the data storage that is executable by one of the plurality of processing units.

24. The data processing system of claim 20, wherein:
the cache memory is a set associative cache memory including a plurality of congruence classes each having multiple entries, wherein the entry belongs to a particular congruence class among the plurality of congruence classes;
the control circuitry determines if the particular congruence class contains more than one non-deleted entry and marks the entry as deleted only in response to determining the particular congruence class contains more than one non-deleted entry.

25. The data processing system of claim 20, wherein:
the cache memory is an upper level cache memory;
the processing unit further includes a lower level cache memory;

the control circuitry, responsive to the indication of the third correctable error and the indication that the first and second correctable errors occurred at too high a frequency, moves the cache line from the data array to the lower level cache memory.

26. The data processing system of claim 20, wherein:

the cache memory is a set associative cache memory including a plurality of congruence classes each containing multiple entries;

the error detection logic provides an indication of detection of the correctable error independent of which entry contains the cache line having the correctable error.

27. The data processing system of claim 20, wherein the first and second correctable errors occur in different cache lines in the cache memory.

28. The data processing system of claim 22, wherein the line delete mechanism determines whether a frequency of correctable errors is too great by determining whether a time interval between detections of the first and second correctable errors is less than a threshold.

29. The data processing system of claim 28, wherein the threshold has a value selected to differentiate stuck-bit correctable errors from soft correctable errors.

* * * * *